Nov. 27, 1923.
J. L. MAPES
1,475,307
DIFFERENTIAL DRIVE FOR MOTOR VEHICLES
Filed Oct. 18, 1922  2 Sheets-Sheet 1
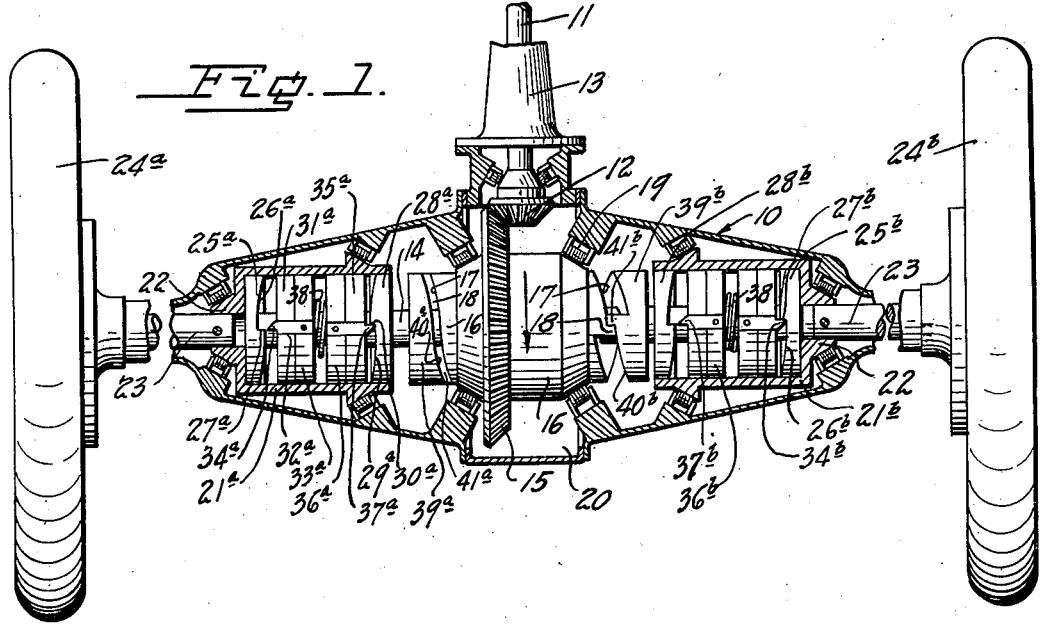
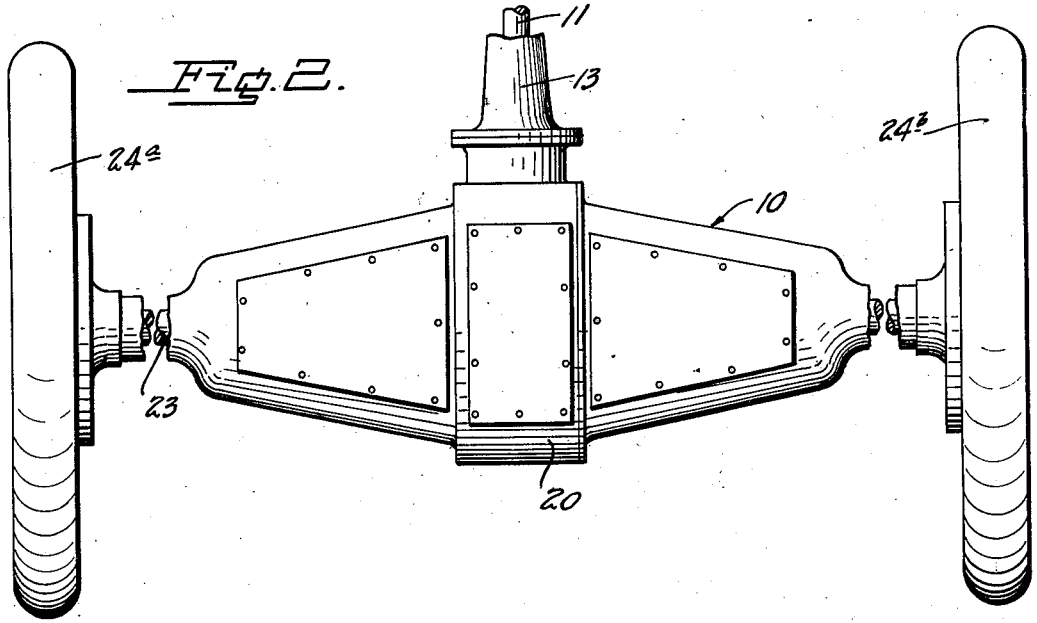
Inventor
James L. Mapes
By Watson E. Coleman
Attorney Nov. 27, 1923. 1,475,307
J. L. MAPES
DIFFERENTIAL DRIVE FOR MOTOR VEHICLES
Filed Oct. 18, 1922  2 Sheets-Sheet 2
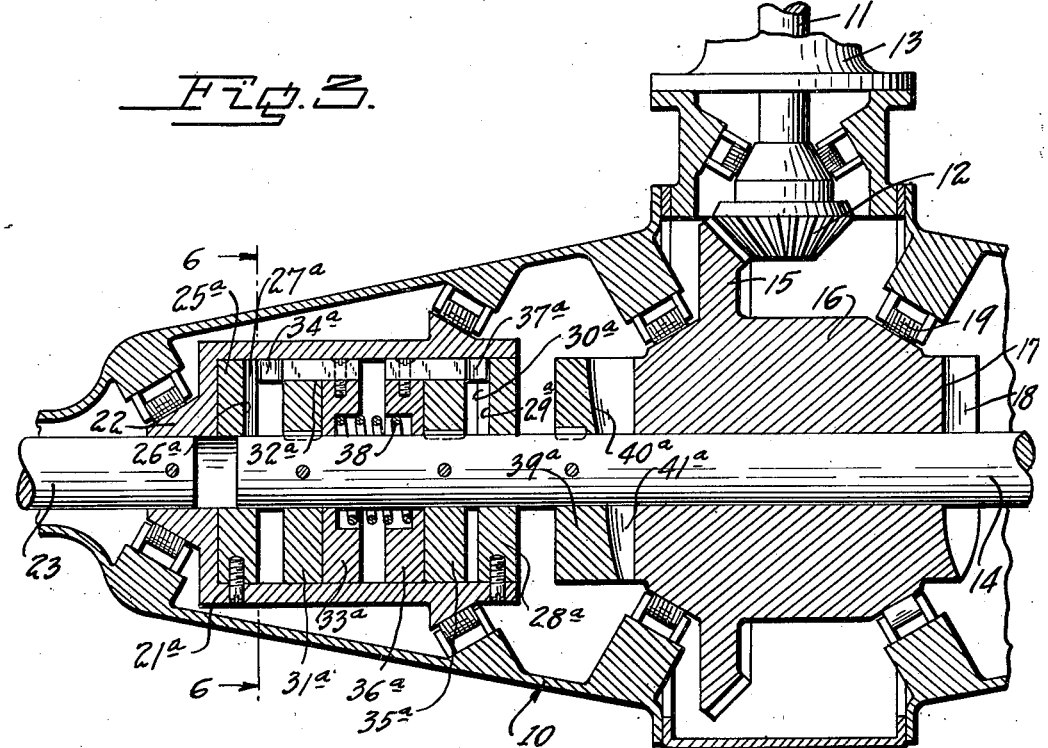
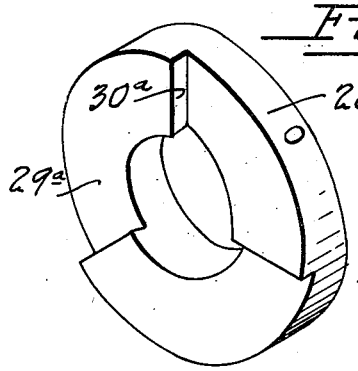
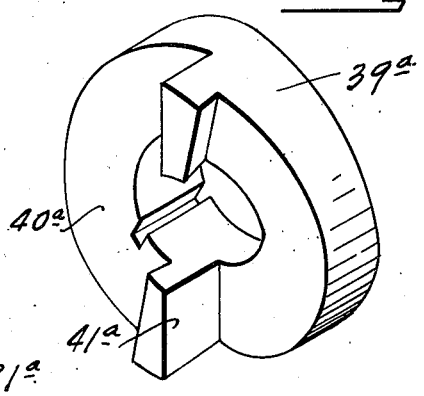
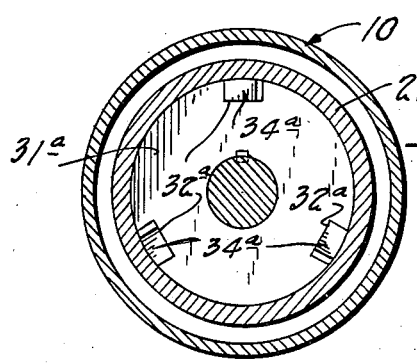
Inventor
James L. Mapes
By Watson E. Coleman
Attorney Patented Nov. 27, 1923.

1,475,307

UNITED STATES PATENT OFFICE.

JAMES L. MAPES, OF JERSEY SHORE, PENNSYLVANIA.

DIFFERENTIAL DRIVE FOR MOTOR VEHICLES.

Application filed October 18, 1922. Serial No. 595,314.

*To all whom it may concern:*

Be it known that I, JAMES L. MAPES, a citizen of the United States, residing at Jersey Shore, in the county of Lycoming and State of Pennsylvania, have invented certain new and useful Improvements in Differential Drives for Motor Vehicles, of which the following is a specification, reference being had to the accompanying drawings.

This invention relates to the driving mechanism of motor vehicles, tractors and the like, and particularly to that part of the driving mechanism which is contained within the rear axle housing, which transmits power to the driving wheels, and which is more particularly known as the differential.

The general object of the present invention is to improve upon the mechanism of this character illustrated, described and claimed in my Patent #1,360,428, granted November 30, 1920, by the provision of means whereby the differential may be automatically reversed instead of requiring reversal by hand, and further by reducing the size, and particularly the length of the parts forming the differential, so that the clutch members and other parts may be disposed adjacent the middle of the driving axle, thus permitting a housing of ordinary shape to be used and considerably reducing the size of the differential and making the mechanism more compact and simpler.

Other objects will appear in the course of the following description.

My invention is illustrated in the accompanying drawings, wherein:—

Figure 1 is a sectional view through the housing of my improved differential showing the differential applied;

Figure 2 is a rear elevation of the construction shown in Figure 1;

Figure 3 is an enlarged sectional view through one side of the differential and housing;

Figure 4 is a perspective view of one of the clutch members 28;

Figure 5 is a perspective view of one of the clutch members 39;

Figure 6 is a section on the line 6—6 of Figure 3.

Referring to these drawings, 10 designates the axle housing of a motor vehicle and 11 the power shaft driven by the crank shaft in the usual manner and extending longitudinally of the automobile or truck and shown as carrying at its rear end a beveled pinion 12. The housing for the driving shaft is designated 13. Disposed within the housing 10 in the usual manner is a longitudinally slidable and rotatable shaft section 14 carrying upon it a gear wheel 15 at all times in engagement with the gear wheel 12. I do not wish to be limited to ordinary beveled gear wheels as the means for transmitting power from the shaft 11 to the shaft 14 but have merely used ordinary beveled gear wheels in the drawings to illustrate a connection between the shaft 11 and the shaft 14. Any sort of driving connection may be used between the driving mechanism of the automobile or truck and the shaft 14.

The beveled gear wheel 15 has laterally projecting hub portions 16, the outer end face of each hub being formed to provide cam faces 17 and clutch teeth 18 at the end of each cam face. These cam faces 17 at one end of the hub have a parallel inclination to the cam faces at the opposite end of the hub and thus the two cam faces are reversed with relation to each other. The wheel 15 with its hub 16 is loosely mounted upon the shaft 14 for free rotation relative thereto but the wheel 15 and its hub 16 are held from longitudinal movement by and rotate in bearings 19 carried by the middle of the housing 10. Thus while the wheel 15 with its hub 16 is held from any longitudinal movement, the shaft 14 may have longitudinal as well as rotative movement.

Disposed concentric to the shaft 14 and extending over the opposite ends thereof are the cylindrical barrels 21ᵃ and 21ᵇ. Each of these barrels are alike. The end of each barrel carries a reducer 22, and a stub shaft 23 is pinned or otherwise engaged with the extremity of each reducer 22 and extends out through the housing 10, may be mounted in suitable bearings therein, and carries driving wheels 24ᵃ and 24ᵇ. The outer end of the barrel or cylinder 21ᵃ has engaged with it for rotation an annular clutch member 25ᵃ, into the center of which the shaft 14 projects, the shaft 14 being slidable with reference to the member 25ᵃ. The inner face of the clutch member 25ᵃ is formed with the cam faces 26$^a$ and the clutch teeth 27$^a$ which face toward the middle of the housing. The opposite end of the barrel 21$^a$ has attached to it the annular clutch member 28$^a$ whose face confronting the clutch member 25$^a$ has cam faces 29$^a$ and the clutch teeth 30$^a$. The shaft 14 slides freely through the clutch member 28$^a$.

Mounted upon the shaft 14 adjacent the clutch member 25$^a$ is an annulus 31$^a$ which is fast on the shaft 14 and shifts longitudinally with this shaft, this annulus being longitudinally grooved at a plurality of points, as at 32$^a$. Disposed against the annulus 31$^a$ is a clutch member 33$^a$ which is loose upon the shaft 14 but which has longitudinally extending clutch teeth 34$^a$ and which extend through the grooves 32$^a$ and project beyond these grooves and are adapted to engage with the teeth 27$^a$ of clutch member 25$^a$. Also mounted upon the shaft 14 adjacent the clutch member 28$^a$ is an annulus 35$^a$ having longitudinally extending grooves upon its outer face, this annulus being pinned or otherwise engaged with the shaft 14 to move therewith and disposed between the annulus 35$^a$ and the clutch member 33$^a$ and against the face of the annulus 35$^a$ is a clutch member 36$^a$ having clutch teeth 37$^a$ which are carried in the grooves or channels in the face of the clutch member 35$^a$. A spring 38 is disposed between the clutch members 33$^a$ and 36$^a$ and forces these clutch members apart so that the teeth 31 and 37 are projected, but it will be obvious that the clutch members 33$^a$ and 36$^a$ may be forced along the shaft against the tension of the spring 38 and thus rendered inoperative.

Pinned or otherwise attached to the axle 14 on each side of the hub 16 are the clutch members 39$^a$ and 39$^b$. The clutch member 39$^a$, for instance, has upon that face confronting the hub 16 two or more helical cam faces 40$^a$ terminating in longitudinally projecting clutch teeth 41$^a$. It will be obvious that these clutch teeth and the cam faces co-act with the faces 17 and the clutch teeth 18 of the hub 16.

Heretofore I have described the arrangement of the clutch members, annuli, etc., on the left hand side of the differential, but it is to be understood that the same construction is used on the right hand side of the differential. I have distinguished the parts on the left hand side of the differential from the parts on the right hand side of the differential, however, by using the exponent "a" on the numerals on the left hand side of the differential and the exponent "b" for the numerals on the right hand side of the differential.

The barrels 21$^a$ are to be supported in suitable bearings within the housing 10 so as to rotate freely therein. The barrels, however, are held from any longitudinal movement and the driven gear wheel 15 with its hub 16 is held also from any longitudinal movement. The distance between the extremity of one barrel 21$^a$ and the outer extremity of the other barrel 21$^b$ will be approximately from 14 to 20″. The stub axles 23 extend outward from the cylinders or barrels 21$^a$ and 21$^b$ to the ends of the axle housing in the usual manner and, as before remarked, are connected in any suitable manner to the driving wheels of the machine. I do not wish to be limited to any particular manner of supporting these driving wheels, as these driving wheels may be of the semi-floating type, the full floating type, or the three-quarter floating type.

The operation of the mechanism is as follows: Assuming that the gear wheel 15 is rotating in the direction of the arrow in Figure 1, in order to drive the car forward, then while the car is running on a straight road driving power will be transmitted to both wheels 24$^a$ and 24$^b$ as follows: The wheel 15 will rotate in the first instance initially until the teeth 18 on both ends of the hub 16 have full engagement with the teeth 41$^a$ and 41$^b$ of the clutch members 39$^a$ and 39$^b$. Power will then be transmitted to the left hand wheel 24$^a$ through the annular member 35$^a$, the teeth 37 of member 36$^a$, and inasmuch as the teeth 37 are in engagement with the teeth 30$^a$ of the annulus 28$^a$, it follows that the barrel 34$^a$ will be rotated and the wheel 24$^a$ will be rotated in the same direction as the wheel 15. At this time, of course, the clutch teeth 34$^a$ are out of engagement with the clutch teeth 27$^a$, this being caused by the bodily movement to the right of the shaft 14 due to the action of the cam faces 17 of the hub upon the two confronting cam faces 40$^a$ and 40$^b$ of the clutch members 39$^a$ and 39$^b$. On the right hand side of the differential, the shaft 14 having been shifted to the right, the teeth 34$^a$ have been carried into engagement with the teeth 27$^b$ of the clutch member 25$^b$, while the teeth 37$^b$ of clutch member 36$^b$ have been shifted out of engagement with the clutch member 28$^b$.

If now the vehicle while proceeding forward should turn a corner and make a circle, one of the stub shafts 23 will, of course, run faster than the other stub shaft. Assuming that the wheel 24$^b$ runs faster than the wheel 24$^a$, then it will be obvious that the parts will retain the position just described but that the cam faces 26$^b$ as they bear against the extremities of the teeth 34$^b$ will simply force these teeth inward against the action of spring 38 to escape the teeth 27$^b$ so that in that case the clutch teeth 34$^b$ will ride over the clutch teeth 27$^b$. The same action will occur if the wheel 24$^a$ is running faster than the wheel 24$^b$, but in that case it will be the clutch teeth 37ª which will be forced inward by the cam faces 29ª on the clutch members 28ª.

This mechanism will operate in the same way when the direction of driving is reversed. Assuming the parts are in the position shown in Figure 1, then upon a reversal of movement of the gear wheel 15 and of the hub 16 the helical cam faces of the hub faces 17 of the hub 16 will shift the cam and clutch members 39ª and 39ᵇ toward the left in Figure 1 until the teeth 18 have engaged the teeth 41ª and 41ᵇ. As soon as this occurs, rotation is communicated to the shaft 14 and thence through the proper clutch members as heretofore described to the barrels or cylinders 21ª and 21ᵇ and thus to the shafts 23 of the wheels 24ª and 24ᵇ. While running backward one wheel may run faster than the other, as in turning curves, precisely as heretofore described for running forward. It will be obvious that if on turning a curve, where the wheel 24ᵇ is rotating faster than the wheel 24ª, the wheel 24ª should strike mud or should otherwise tend to slip so that it will not get sufficient traction against the road, the wheel 24ᵇ will slow down, for instance, and power will be transmitted to the wheel 24ᵇ and the machine would proceed under the power of wheel 24ᵇ until the wheel 24ª again secured traction or until the vehicle straightened out, whereupon power would be transmitted to both of the wheels 24ª and 24ᵇ. If either of the cylindrical or barrel-shaped hollow shaft sections 21ª or 21ᵇ should break, power would still be transmitted to that shaft section which was unbroken and to the wheel corresponding thereto and the mechanism would act precisely as it does where one wheel strikes mud and fails to secure any tractive engagement with the road. The car can then proceed under the power applied to one wheel. This is impossible with differentials as ordinarily constructed.

In descending a grade, it is obvious that with this differential the driving clutch of the machine may be left in and that with the power cut off the gear wheel 15 will be automatically shifted to its reversing position or backing position, in which case the power shaft will be connected to the wheels and the motor will run as a compressor and act as a brake. Should the motor become stalled in descending a grade, the wheels will still remain connected to the power shaft and the motor will act as a brake. Thus there is no possibility of the rear end of the vehicle slewing or skidding.

It will be seen that the mechanism heretofore described and illustrated embodies in effect a driving shaft 14 with means comprising the gear wheel 15 and the hub portion 16 and the clutch members 39ª and 39ᵇ whereby the driving shaft may be rotated in either direction, the driven shafts or shaft sections consisting of the stub shafts 23 and the barrels 21ª and 21ᵇ, and means operated by a reversal of movement of the driving means 15 and 16 which renders one of said ratchet mechanisms connecting the driving shaft and driven shafts inoperative and the other set of ratchet mechanisms operative.

It will also be noted that the teeth 34ª and 37ª and 34ᵇ and 37ᵇ constitute spring actuated pawls or teeth coacting with ratchet wheels 25ª and 25ᵇ and 28ª and 28ᵇ, and that the pawls or teeth 34ª and 34ᵇ and 37ª and 37ᵇ coact with the corresponding ratchet wheels in the same general manner as ordinary ratchet teeth, permitting the riding of the pawl over the ratchet teeth upon a movement of the ratchet teeth in one direction and the engagement of the pawl with the ratchet teeth for coincident rotation upon a movement of the ratchet wheel in the opposite direction.

While I have illustrated a particular embodiment of my invention which is thoroughly effective for the purpose intended, I do not wish to be limited thereto, as it is obvious that the details of construction of the clutch members and the precise arrangement of parts illustrated might be changed without departing from the spirit of the invention as defined in the appended claims.

I claim:—

1. A driving mechanism for motor vehicles including a longitudinally shiftable driving shaft, means for driving the shaft in opposite directions including a gear wheel loosely mounted upon the shaft but held from longitudinal movement, the gear wheel having means whereby to shift the driving shaft longitudinally in one direction or the other as the gear wheel is rotated in one direction or the other, laterally disposed driven shafts, a pair of oppositely and alternately operated ratchet mechanisms connecting each driven shaft with the driving shaft, and means operated by the longitudinal movement of the driving shaft rendering inoperative the ratchet mechanisms of the respective driven shafts previously operated.

2. A driving mechanism for motor vehicles including a longitudinally movable driving shaft, lateral driven shafts, a pair of oppositely and alternately operated ratchet mechanisms connecting each driven shaft with the driving shaft, and means for driving the driving shaft in opposite directions and shifting the driving shaft alternately in opposite directions including a driving wheel loosely mounted on the driving shaft, oppositely disposed cams mounted upon the driving shaft and having projecting teeth, and oppositely disposed cam members mounted upon the driving shaft on each side of the first named cam and having cam faces confronting the cam faces of the driving shaft and having teeth coacting with the teeth thereof.

3. A driving mechanism for motor vehicles including a housing, a longitudinally shiftable driving shaft disposed within the housing concentrically thereto, a gear wheel loosely mounted upon the shaft for rotation independent thereof, means for rotating said gear wheel in opposite directions, means on the housing for holding the gear wheel from longitudinal movement, means on said gear wheel for automatically shifting the driving shaft longitudinally in one direction or the other as the gear wheel is rotated in one direction or the other, laterally disposed driven shafts, a pair of oppositely and alternately operated ratchet mechanisms connecting each driven shaft with the driving shaft, and means operated by the longitudinal movement of the driving shaft for rendering inoperative the ratchet mechanisms of the respective driven shafts previously operated.

4. A driving mechanism for motor vehicles comprising a middle driving section including a driving shaft, lateral driven sections, the driving shaft extending loosely through the driven sections, a pair of driven clutch members fast to each driven section having ratchet clutch teeth reversed relatively to each other, a pair of coacting clutch members associated with each pair of driven clutch members and having spring projected clutch teeth complementary thereto, the driving clutch members being mounted on the end portions of the driving shaft for longitudinal and rotary movement therewith, said driving shaft being longitudinally shiftable to carry one or the other of the driving clutch members of each pair into engagement with its coacting driven clutch member, and means forming part of the driving section for shifting the driving shaft longitudinally in one direction or the other upon a rotation of the driving section in one direction or the other and then rotatively engaging the said driving shaft.

5. A driving mechanism for motor vehicles comprising a driving shaft, lateral driven sections, the driving shaft being concentric to but separate from the driven sections, a pair of driven clutch members fast on each driven section having ratchet clutch teeth reversed relatively to each other, a pair of coacting driving clutch members associated with each pair of driven clutch members and having spring projected clutch teeth complementary thereto, the driving clutch members being mounted on the end portions of the driving shaft for longitudinal and rotary movement therewith, said driving shaft being longitudinally shiftable to carry one or the other of the driving clutch members of each pair into engagement with its coacting driven clutch member, and means on the driving shaft for shifting the driving shaft longitudinally and then rotating the driving shaft comprising a power operated rotatable member having laterally projecting hub portions formed at their ends with complementary cam faces and longitudinally projecting teeth at the ends of the cam faces, and cam members mounted upon the driving shaft and having cam faces confronting the cam faces on the hub portion of the driving member and having clutch teeth adapted to engage with the clutch teeth thereof.

6. A driving mechanism for motor vehicles comprising a middle driving shaft, lateral driven sections disposed concentrically to the driven shaft and separate therefrom, a pair of driven clutch members fast on each driven section having ratchet clutch teeth reversed relatively to each other, a pair of coacting driving clutch members associated with each pair of driven clutch members and having spring projected ratchet teeth complementary thereto, the driving clutch members being mounted on the end portions of the driving shaft for longitudinal and rotative movement therewith, said driving shafts being longitudinally shiftable to carry one or the other of the driving clutch members of each pair into engagement with its coacting driven clutch member, a gear wheel loosely surrounding the driving shaft between the driven sections and having laterally projecting hub portions formed with cam faces on their ends and longitudinally extending clutch teeth at the ends of the cam faces, bearings supporting the gear wheel against end thrust, the driving shaft being rotatively supported within the gear wheel, and complementary cam members mounted upon the driving shaft for rotation and longitudinal movement therewith and having cam faces confronting the cam faces of the gear wheel, said cam faces at their ends having longitudinally extending teeth adapted to be engaged by the teeth on the cam faces of the gear wheel.

7. In a motor vehicle, a transversely extending housing, a driving shaft disposed within the housing, lateral hollow driven sections into which the driving shaft extends, the driven sections being mounted in suitable bearings in the housing and having laterally projecting stub shafts rotatable therewith, a pair of driven clutch members fast on each driven section having ratchet clutch teeth reversed relatively to each other, a pair of coacting driving clutch members associated with each pair of driven clutch members and having spring projected ratchet teeth complementary thereto, the driving clutch members being mounted on the end portions of the driving shaft for longitudinal and rotary movement therewith, said driving shaft being longitudinally shiftable within the driven sections to carry one or the other of the driving clutch members of each pair into engagement with its coacting driven clutch member, means on the driving shaft for rotating the driving shaft in either direction and shifting the driving shaft longitudinally in one direction or the other comprising a gear wheel having laterally projecting hub portions, the hub portions being formed with cam faces at their ends and with clutch teeth at the ends of the cam faces, the cam faces on one end being approximately parallel to the cam faces on the opposite end, coacting cam members mounted upon the driving shaft on each side of the gear wheel and having cam faces confronting the cam faces on the gear wheel and complementary thereto and having longitudinally projecting clutch teeth engageable by the clutch teeth on the gear wheel cam faces, and bearings within the housing for said gear wheel holding the gear wheel against end thrust.

8. In a motor vehicle, a transversely extending housing, a driving shaft disposed within the housing at the middle thereof, barrels rotatably mounted within the housing within which the ends of the driving shaft extend, stub shafts mounted upon the outer ends of the barrels and rotatable therewith and extending out longitudinally through said housing in opposite directions, a pair of annular driven clutch members disposed within each barrel having ratchet clutch teeth reversed relative to each other and through which clutch members the driving shaft extends, a pair of coacting driving clutch members associated with each pair of driven clutch members and having spring projected ratchet teeth complementary thereto, the driving clutch members being mounted upon the driving shaft for longitudinal and rotary movement therewith, said driving shaft being longitudinally shiftable to carry one or the other of the driving clutch members of each pair into engagement with its coacting driven clutch member, means on the driving shaft for rotating the same and automatically shifting the driving shaft longitudinally in one direction or the other upon a reversal of rotation of the driving shaft comprising a gear wheel loosely surrounding the middle of the driving shaft and supported in bearings in said housing, the gear wheel having laterally projecting hub portions formed with a plurality of cam faces at their ends, the extremity of each cam face being formed with a longitudinally extending clutch tooth and the cam faces extending approximately parallel to each other, and cam members mounted upon the driving shaft to rotate and longitudinally shift therewith and having cam faces confronting the cam faces on the hub of the gear wheel and complementary thereto, the ends of the cam faces having longitudinally extending clutch teeth coacting with the clutch teeth on said gear wheel.

In testimony whereof I hereunto affix my signature.

JAMES L. MAPES.